(12) United States Patent
Lee

(10) Patent No.: US 11,334,177 B2
(45) Date of Patent: May 17, 2022

(54) SWITCH MODULE APPLIED IN WIRELESS MOUSE

(71) Applicant: Cheng Uei Precision Industry Co., Ltd., New Taipei (TW)

(72) Inventor: Tsung Shih Lee, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 108 days.

(21) Appl. No.: 16/991,682

(22) Filed: Aug. 12, 2020

(65) Prior Publication Data

US 2021/0141466 A1 May 13, 2021

(30) Foreign Application Priority Data

Nov. 8, 2019 (CN) .......................... 201921925669.6

(51) Int. Cl.
*G06F 3/0354* (2013.01)
*G06F 3/038* (2013.01)
*H04W 4/80* (2018.01)

(52) U.S. Cl.
CPC .......... *G06F 3/038* (2013.01); *G06F 3/03543* (2013.01); *G06F 2203/0384* (2013.01)

(58) Field of Classification Search
CPC ................. G06F 3/038; G06F 3/03543; G06F 2203/0384
See application file for complete search history.

(56) References Cited

U.S. PATENT DOCUMENTS

| 8,598,479 | B2* | 12/2013 | Quan ................. H01H 13/7073 200/293 |
| 2009/0268382 | A1* | 10/2009 | Zhao ...................... H01H 13/14 361/679.01 |
| 2016/0217943 | A1* | 7/2016 | Kim ........................ H01H 13/14 |
| 2020/0152401 | A1* | 5/2020 | Huang ................. H01H 13/023 |
| 2020/0185164 | A1* | 6/2020 | Huang .................. H01H 3/122 |
| 2020/0201451 | A1* | 6/2020 | Lee ......................... G06F 3/0362 |
| 2021/0103347 | A1* | 4/2021 | Lee .......................... G06F 3/038 |

* cited by examiner

*Primary Examiner* — Bryan Earles
(74) *Attorney, Agent, or Firm* — Lin & Associates Intellectual Property, Inc.

(57) ABSTRACT

A switch module includes a pressing button and a circuit board. A bottom surface of the pressing button has an operation rod. The operation rod moves from a first position to a second position. The pressing button has an extending arm located to one end of the operation rod. One end of the extending arm has a blocking block. A top surface of the pressing button extends opposite to the operation rod to form at least one extending foot. The circuit board is disposed above and spaced from the pressing button. The circuit board is equipped with a first switch and a second switch. The at least one extending foot is corresponding to the first switch. The extending arm is corresponding to the second switch.

16 Claims, 21 Drawing Sheets

SWITCH MODULE APPLIED IN WIRELESS MOUSE

CROSS-REFERENCE TO RELATED APPLICATION

The present application is based on, and claims priority from, China Patent Application No. 201921925669.6, filed Nov. 8, 2019, the disclosure of which is hereby incorporated by reference herein in its entirety.

BACKGROUND OF THE INVENTION

1. Field of the Invention

The present invention generally relates to a switch applied in a mouse, and more particularly to a switch module applied in a wireless mouse and having a smaller occupying space and a lower manufacturing cost, and the wireless mouse having a smaller assembling space and a lower cost.

2. The Related Art

As is known to all, a wireless mouse has a wireless transmission capacity and is capable of being paired with a computer host to be used by a wireless technology. When a user operates the wireless mouse, the wireless mouse is used without a limitation of a cable, so the wireless mouse is used quite conveniently.

Generally, a conventional switch module is applied in a conventional wireless mouse. When a conventional wireless mouse is paired with the computer host, a USB (Universal Serial Bus) adaptor need be inserted into an insertion hole of the computer host. When the conventional switch module is turned on, operation orders of the conventional wireless mouse are capable of being transmitted to the computer host by virtue of the USB adaptor. However, the conventional wireless mouse need provide the USB adaptor to the user, and it is inconvenient to carry the conventional wireless mouse and the USB adaptor simultaneously, so when the conventional wireless mouse is used, the conventional wireless mouse will have a loss problem and have a higher cost.

Another conventional switch module is applied in the conventional wireless mouse which is a blue tooth mouse, the blue tooth mouse is capable of being paired with the computer host to be used through a blue tooth technology, and the USB adaptor is needless of being provided in addition. The conventional switch module which includes a switch and a blue tooth pairing key. However, the blue tooth mouse need provide the blue tooth pairing key additionally, when the user uses the blue tooth mouse, the conventional switch module of the blue tooth mouse must be turned on to realize a power-on function, and then the blue tooth pairing key is pressed to proceed with a blue tooth pairing. Furthermore, the switch and the blue tooth pairing key of the blue tooth mouse on the market are mostly two independent and separated structures, so the conventional switch module has a larger occupying space and a higher manufacturing cost, correspondingly the blue tooth mouse has a higher cost, and a larger assembling space of the blue tooth mouse is considered to mount the conventional switch module in the blue tooth mouse.

In view of the above-mentioned problems, it is essential to provide an innovative switch module applied in a wireless mouse and having a smaller occupying space and a lower manufacturing cost, and an innovative wireless mouse including the innovative switch module, and having a smaller assembling space and a lower cost.

SUMMARY OF THE INVENTION

An object of the present invention is to provide a switch module applied in a wireless mouse. The wireless mouse includes an outer shell assembly which includes a lower shell, and a stopping portion formed at the lower shell. The lower shell has a first position and a second position opposite to each other. The switch module includes a pressing button and a circuit board. A bottom surface of the pressing button has an operation rod. The operation rod is exposed out of the lower shell, and the operation rod moves from the first position to the second position. The pressing button has an extending arm located to one end of the operation rod. One end of the extending arm has a blocking block. A top surface of the pressing button extends opposite to the operation rod to form at least one extending foot. The circuit board is fastened to the lower shell. The circuit board is disposed above and spaced from the pressing button. The circuit board is equipped with a first switch mounted to a top surface of one side of the circuit board, and a second switch mounted to a bottom surface of the circuit board. The at least one extending foot is corresponding to the first switch. The extending arm is corresponding to the second switch. When the operation rod is located at the first position, the at least one extending foot is without touching the first switch, the blocking block is blocked by the stopping portion, when the operation rod is located at the second position, the at least one extending foot pushes the first switch, the blocking block breaks away from the stopping portion.

Another object of the present invention is to provide a switch module applied in a wireless mouse. A middle of a top surface of a lower portion of the lower shell protrudes upward to form a buckling hook. The lower shell has a first position and a second position opposite to each other. The switch module includes a pressing button and a circuit board. The pressing button has a fastening portion, a cantilever arm opposite to the fastening portion, and a connecting portion connected between the cantilever arm and the fastening portion. A bottom surface of the cantilever arm protrudes downward to form an operation rod. The operation rod is exposed out of the lower shell, and the operation rod moves from the first position to the second position. The cantilever arm has a base board. One side of a top surface of the base board protrudes outward and extends to a bottom surface of the base board to form an extending arm located to one end of the operation rod. One end of the extending arm extends perpendicular to one side surface of the cantilever arm and faces the fastening portion to form a blocking block. At least one portion of one side of a top surface of the cantilever arm protrudes upward and opposite to the operation rod to form at least one extending foot. The circuit board is fastened to the lower shell. The circuit board is disposed above and spaced from the pressing button. The circuit board is equipped with a first switch and a second switch. The at least one extending foot is corresponding to the first switch. The extending arm is corresponding to the second switch. When the operation rod is located at the first position, the at least one extending foot is without touching the first switch, the blocking block is blocked by a bottom surface of an upper portion of the buckling hook, when the operation rod is located at the second position, the at least one extending foot pushes the first switch, the blocking block breaks away from the buckling hook.

Another object of the present invention is to provide a switch module applied in a wireless mouse which includes a lower shell. The lower shell has a first position and a second position opposite to each other. The switch module includes a pressing button and a circuit board. The pressing button has a cantilever arm, an operation rod protruded downward from a bottom surface of the cantilever arm, and an extending arm located to one end of the operation rod. The operation rod is exposed out of the lower shell, and the operation rod moves from the first position to the second position. One end of a top surface of the extending arm protrudes upward to form a blocking block. At least one portion of one side of a top surface of the cantilever arm protrudes upward and opposite to the operation rod to form at least one extending foot. The circuit board is fastened to the lower shell. The circuit board is disposed above and spaced from the pressing button. The circuit board is equipped with a first switch and a second switch. One side of the circuit board is recessed inward to form an accommodating recess. A front of the one side of the circuit board is recessed inward to form a lacking groove. The lacking groove is spaced from the accommodating recess by a blocking area. The at least one extending foot is corresponding to the first switch. The extending arm is corresponding to the second switch. When the operation rod is located at the first position, the at least one extending foot is without touching the first switch, the blocking block abuts against the blocking area, when the operation rod is located at the second position, the at least one extending foot pushes the first switch, the blocking block moves to be under the lacking groove.

As described above, in a process of pushing the operation rod to move frontward and rearward, when the operation rod is located at the first position, the at least one extending foot is without driving the first switch, the protruding block is buckled in the first buckling hole, the blocking block is blocked by the buckling hook to make the pressing button have no way of being pressed, at the moment, a power function is turned off, when the operation rod is located at the second position, the at least one extending foot drives the first switch, the protruding block is buckled in the second buckling hole, the blocking block breaks away from the buckling hook, or the blocking block moves to be under the lacking groove to make the pressing button be able to be pressed, at the moment, the power function is turned on, and the operation rod is able to be pressed towards the circuit board to make the extending arm touch the second switch to execute a blue tooth pairing function. As a result, the switch module is applied in the wireless mouse, and has a smaller occupying space and a lower manufacturing cost, and the wireless mouse has a smaller assembling space and a lower cost.

BRIEF DESCRIPTION OF THE DRAWINGS

The present invention will be apparent to those skilled in the art by reading the following description, with reference to the attached drawings, in which:

FIG. 11 is a schematic diagram showing that a power function of the wireless mouse in accordance with the first preferred embodiment of the present invention is turned on;

FIG. 12 is a partially schematic diagram showing that a power function of the switch module of the wireless mouse in accordance with the first preferred embodiment of the present invention is turned on;

FIG. 13 is a schematic diagram showing that the power function of the switch module in accordance with the first preferred embodiment of the present invention is turned on;

FIG. 21 is a schematic diagram showing that the power function of the switch module in accordance with the second preferred embodiment of the present invention is turned on.

DETAILED DESCRIPTION OF THE PREFERRED EMBODIMENT

Figure 1:
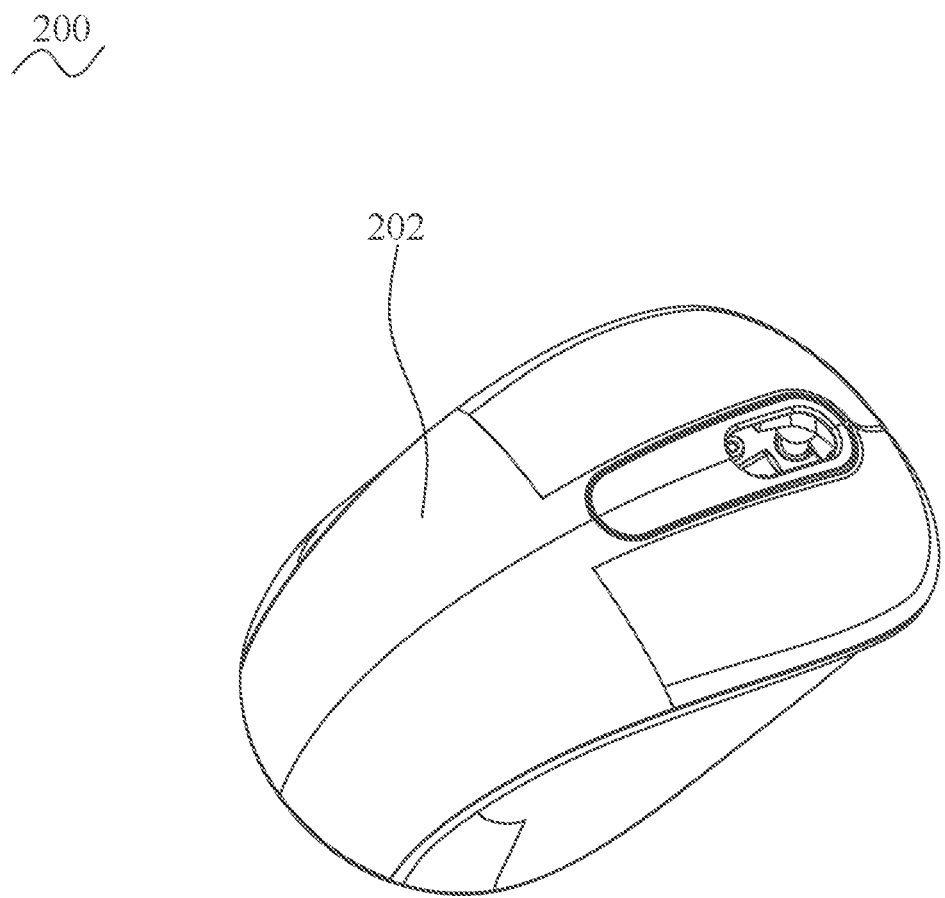
FIG. 1 is a perspective view of a wireless mouse in accordance with a first preferred embodiment of the present invention, wherein the wireless mouse includes a switch module.
Figure 2:
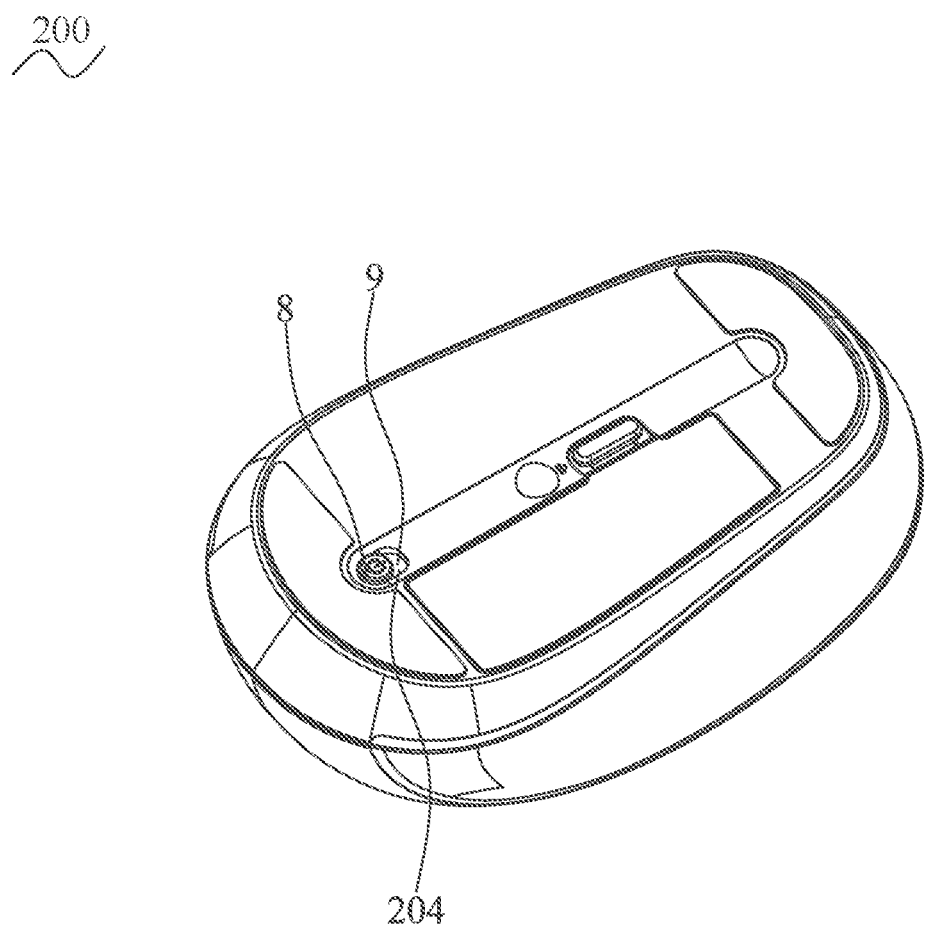
FIG. 2 is another perspective view of the wireless mouse of FIG. 1.
Figure 3:
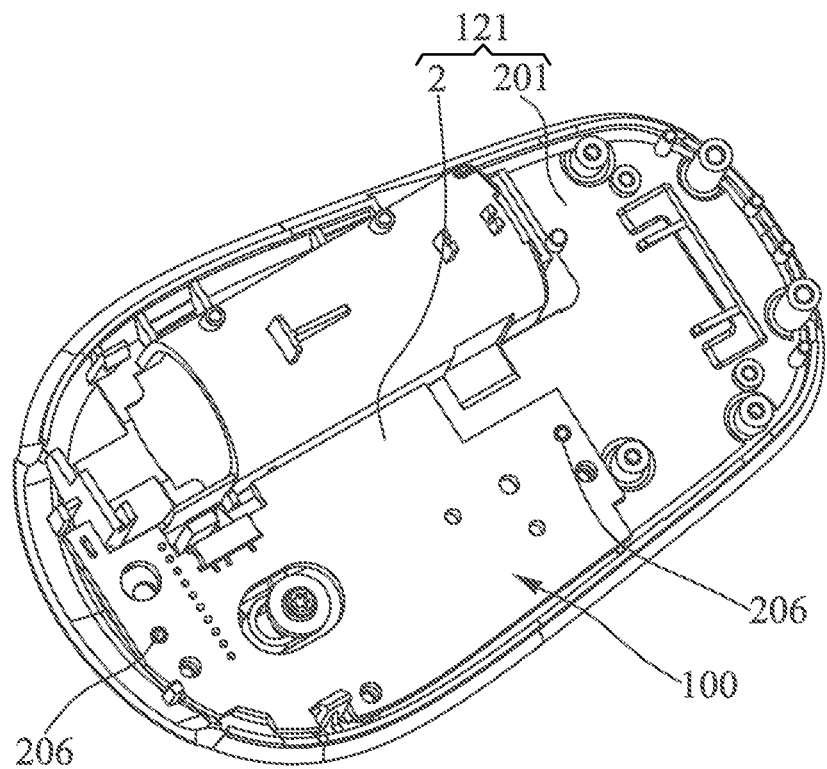
FIG. 3 is a location diagram of the switch module applied in the wireless mouse of FIG. 1.
Figure 4:
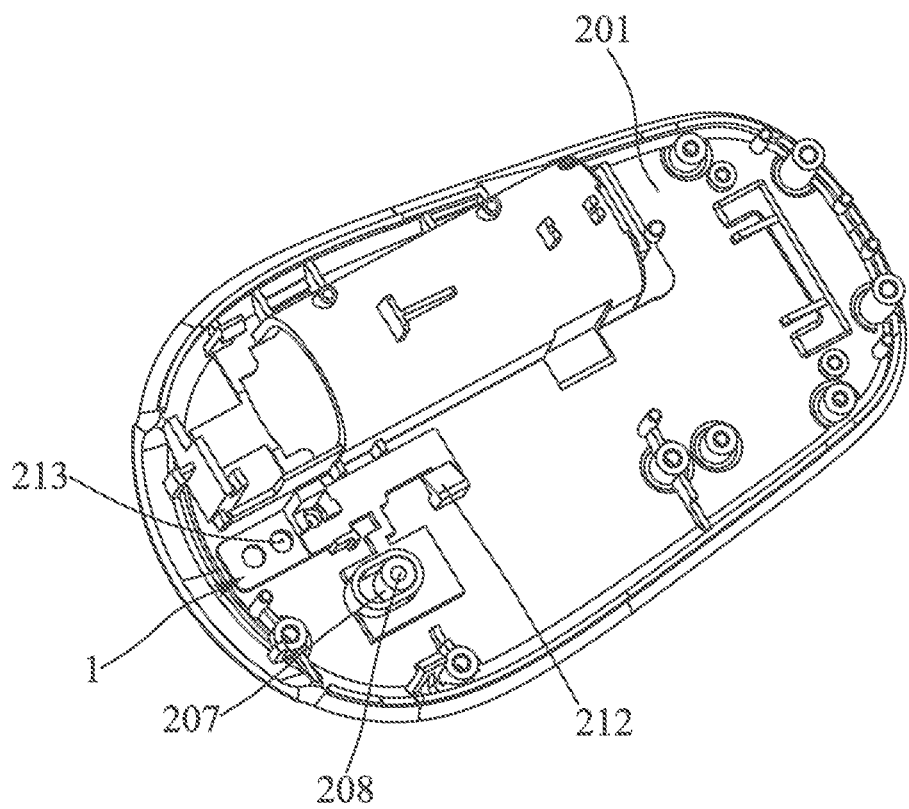
FIG. 4 is a key location diagram of the switch module applied in the wireless mouse of FIG. 1.

With reference to FIG. 1 to FIG. 4, a switch module 100 in accordance with a first preferred embodiment of the present invention is shown. The switch module 100 is applied in the wireless mouse 200. The wireless mouse 200 includes a lower shell 201, the switch module 100 and an upper shell 202. The switch module 100 is mounted to the lower shell 201 of the wireless mouse 200. In a concrete implementation, the switch module 100 is also capable of being assembled to other types of devices (not shown). The wireless mouse 200 includes an outer shell assembly 121. The outer shell assembly 121 includes the lower shell 201, a stopping portion 122 formed at the lower shell 201, and a circuit board 2 fastened to the lower shell 201.

Figure 5:
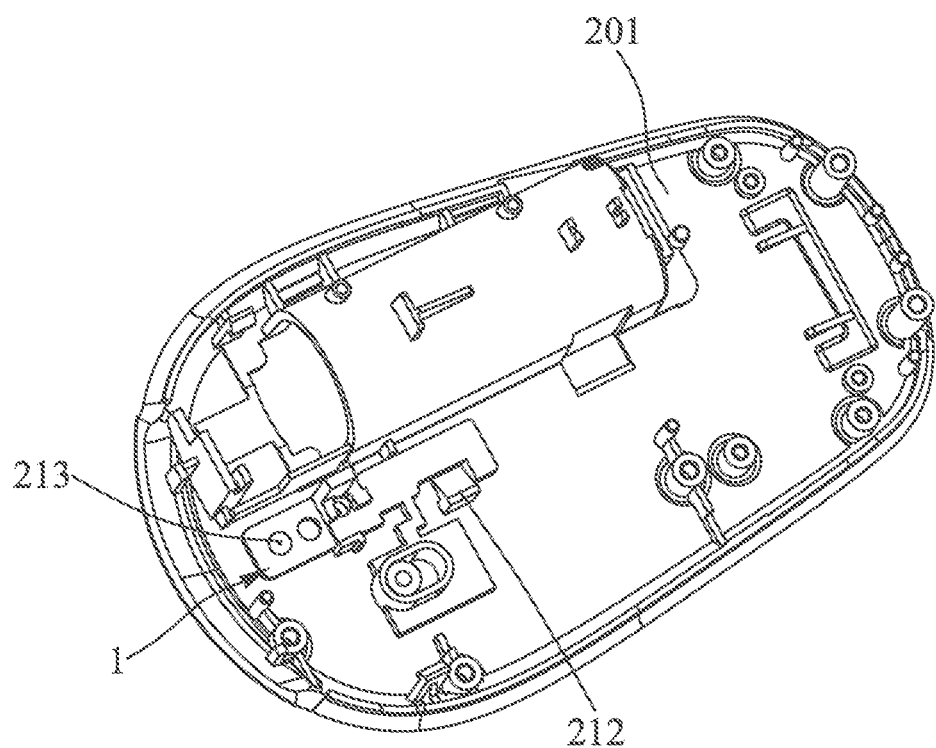
FIG. 5 is another key location diagram of the switch module applied in the wireless mouse of FIG. 1.
Figure 6:
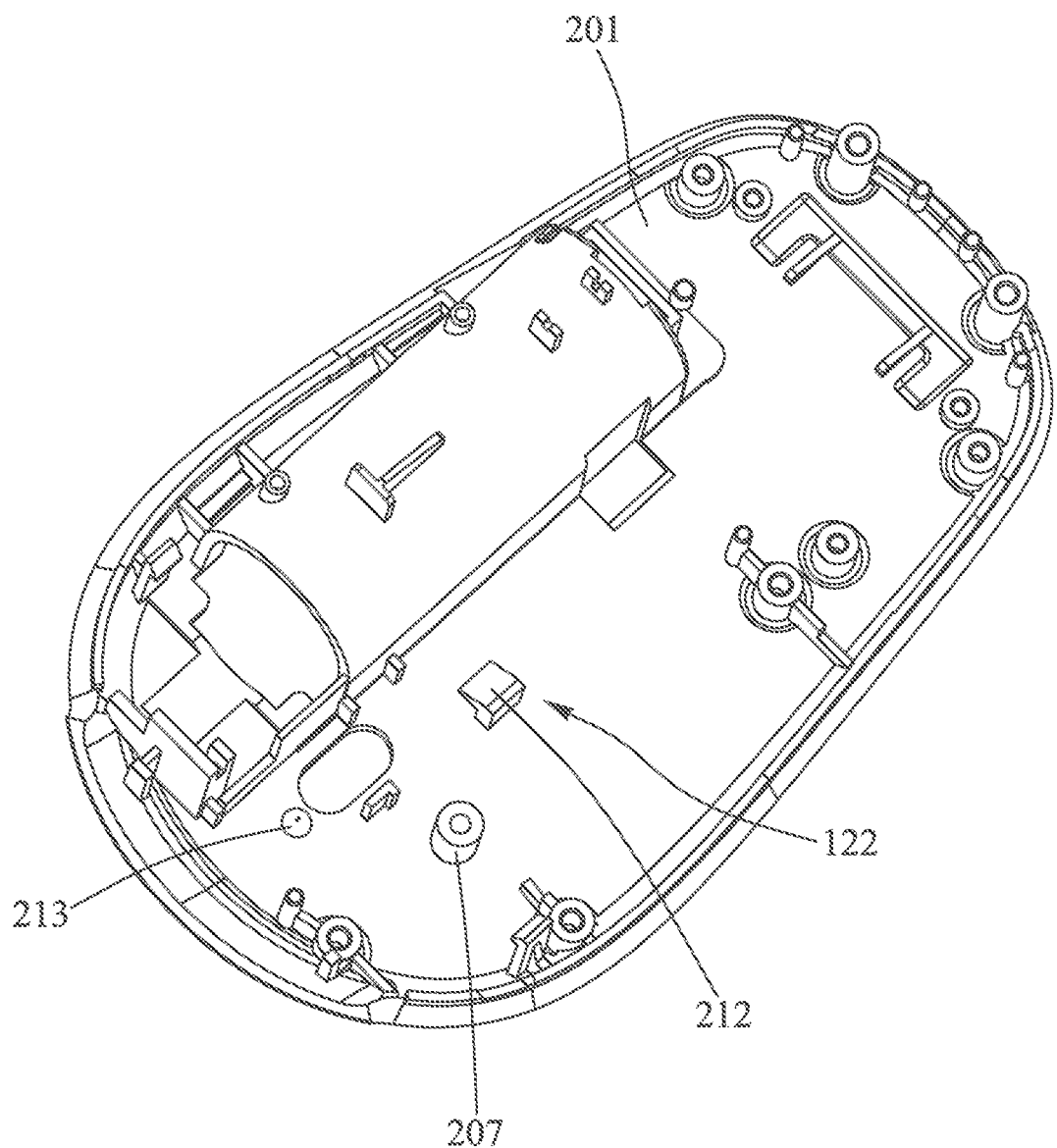
FIG. 6 is a perspective view of a lower shell of the wireless mouse of FIG. 1.
Figure 7:
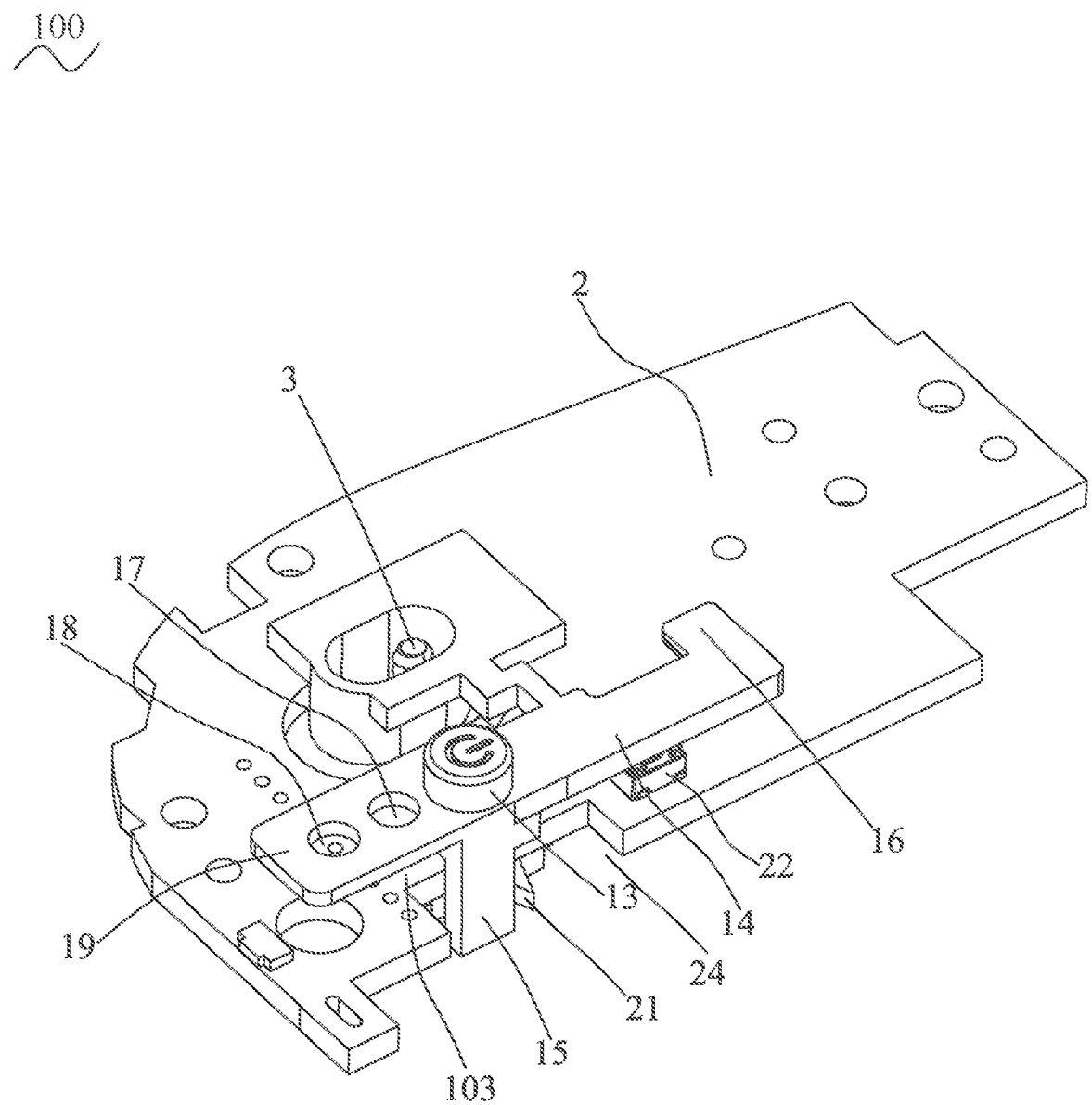
FIG. 7 is a perspective view of the switch module of FIG. 1.
Figure 8:
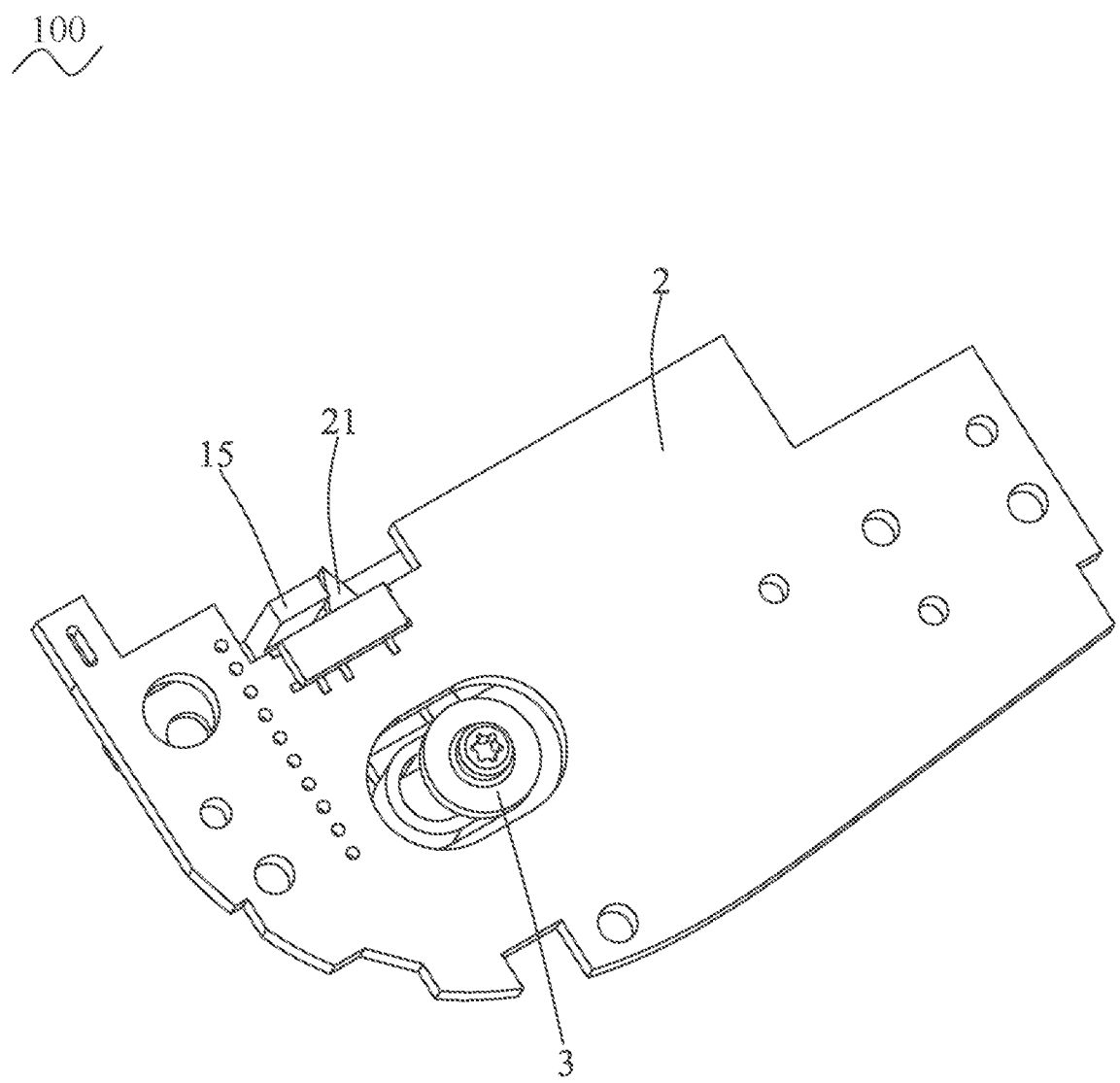
FIG. 8 is another perspective view of the switch module of FIG. 1.
Figure 9:
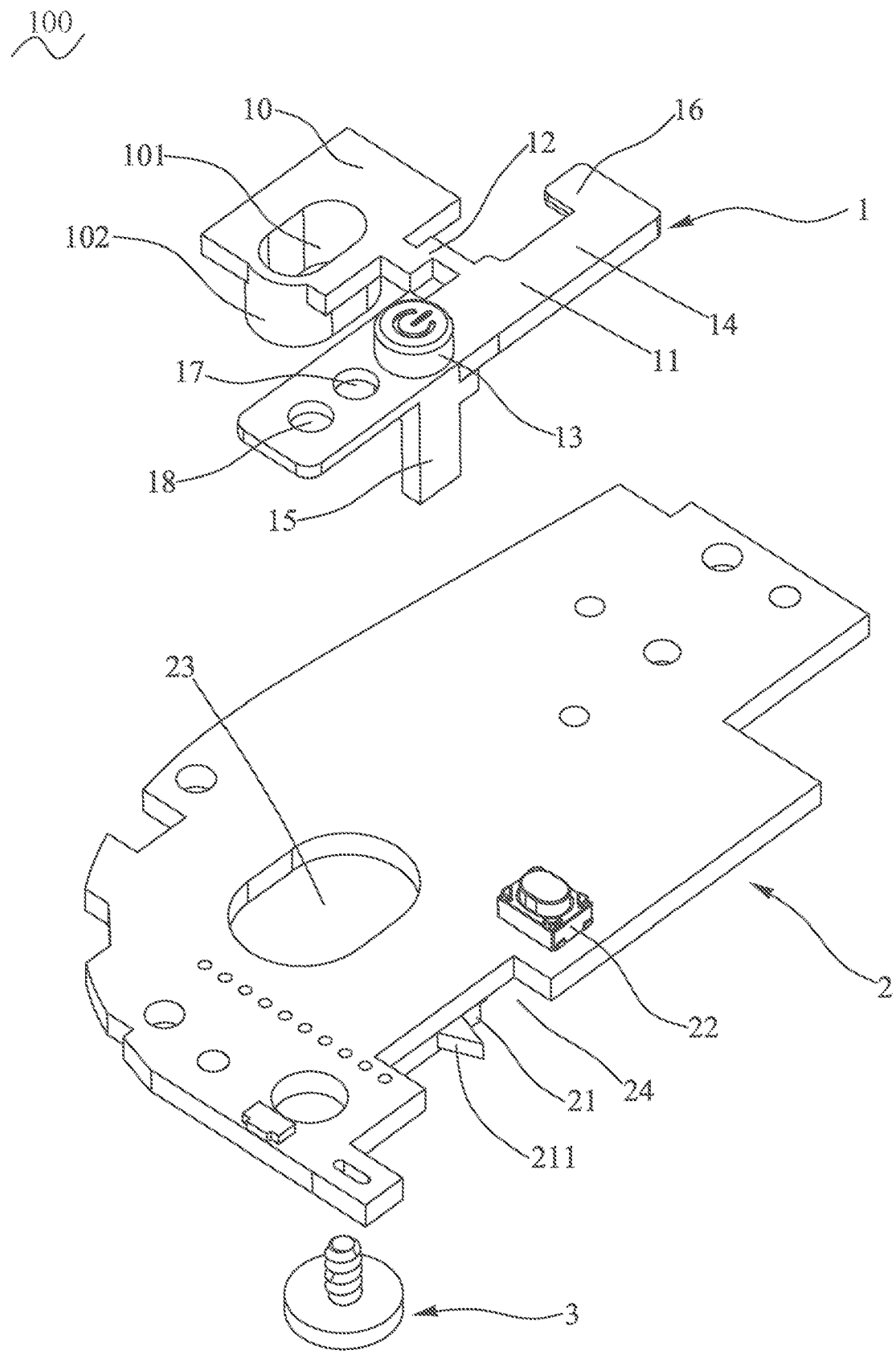
FIG. 9 is an exploded perspective view of the switch module of the wireless mouse of FIG. 1.
Figure 10:
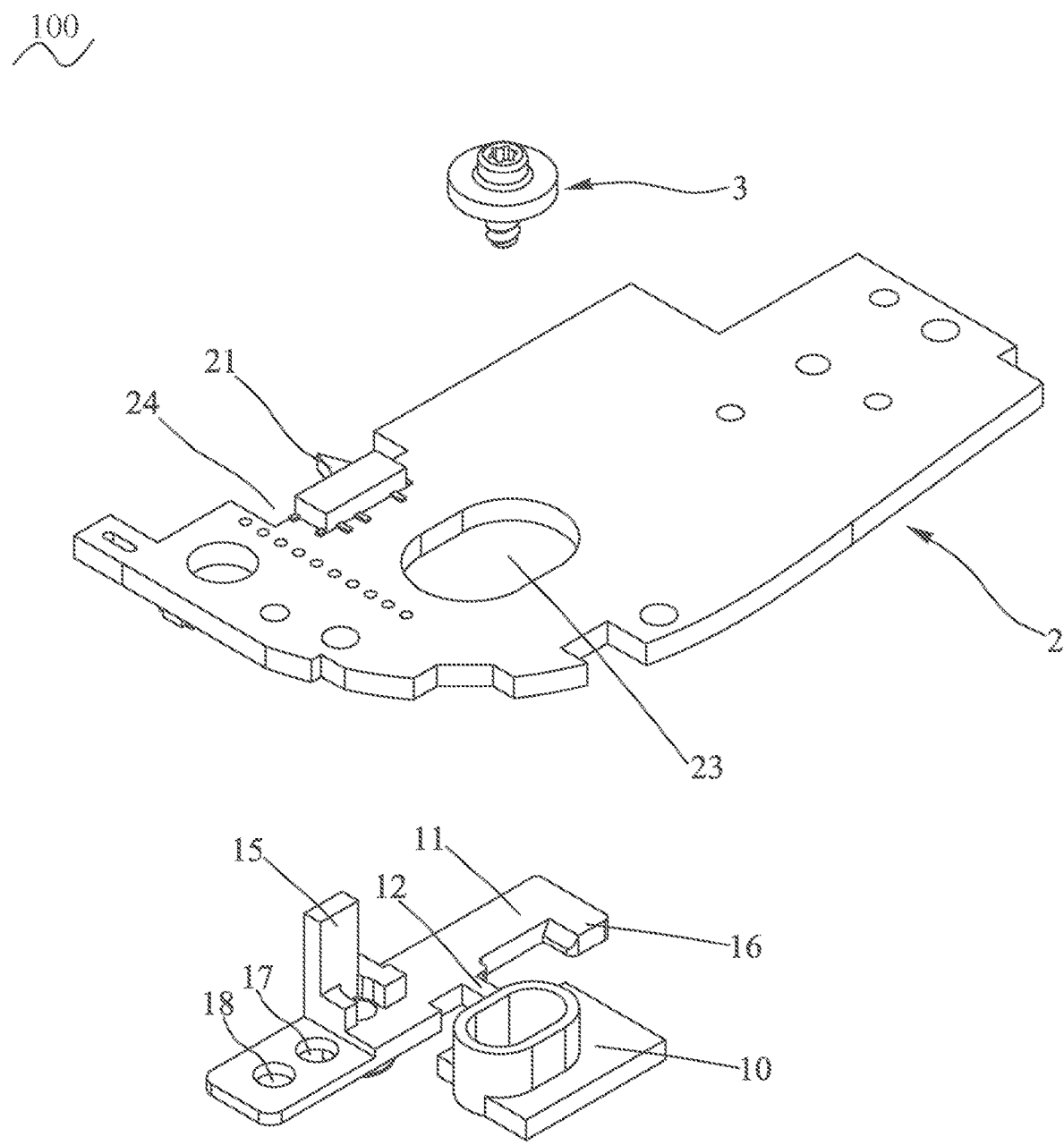
FIG. 10 is another exploded perspective view of the switch module of the wireless mouse of FIG. 1.
Figure 11:
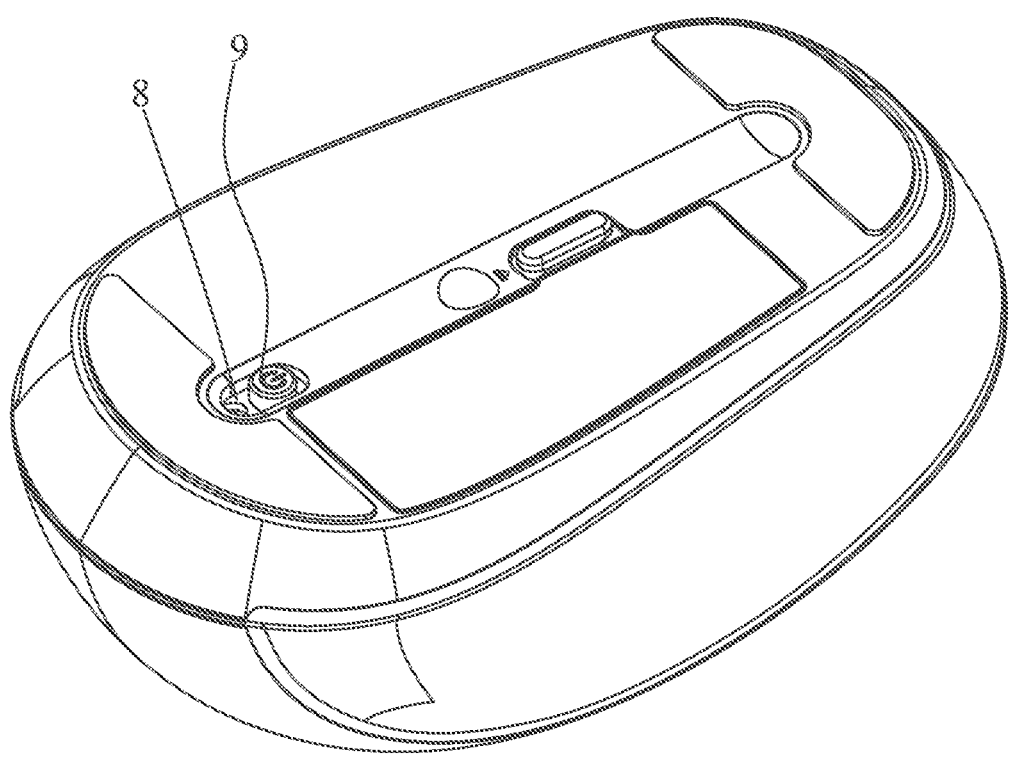
Figure 12:
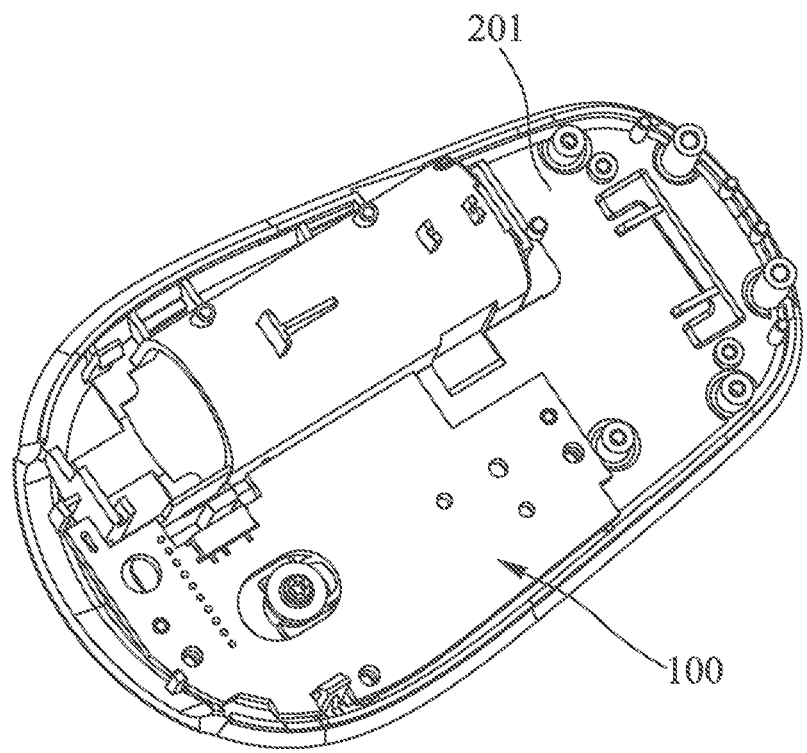
Figure 13:
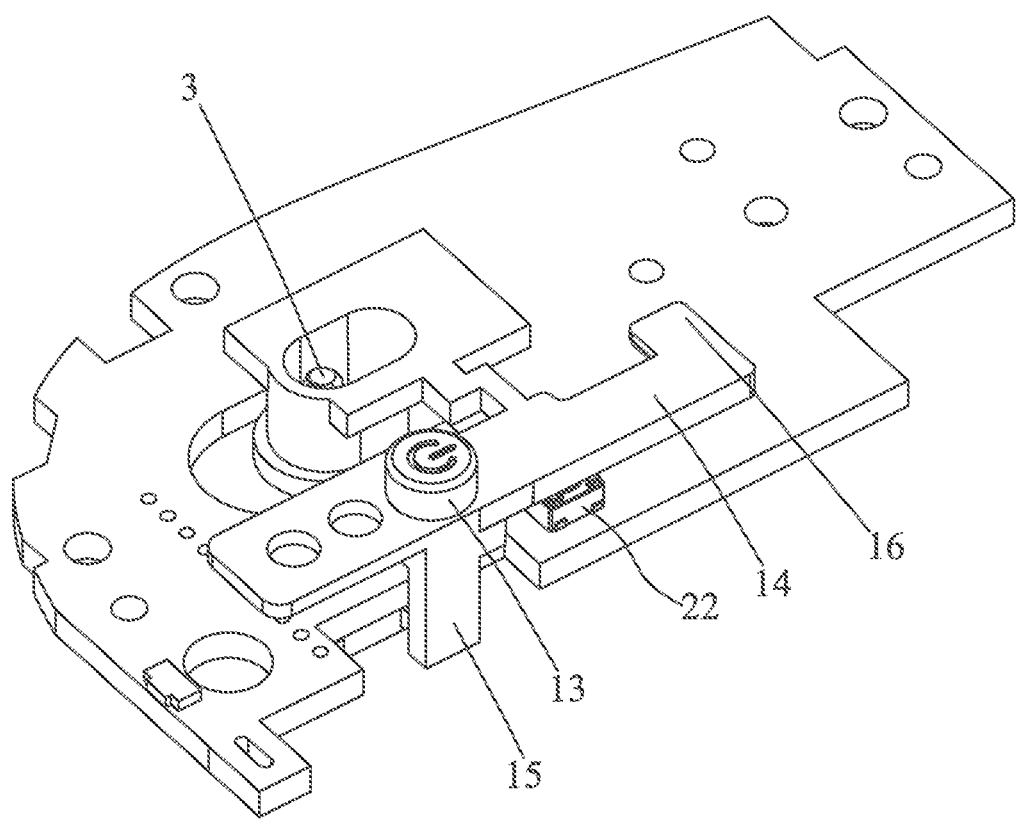

With reference to FIG. 1 to FIG. 6, the switch module 100 and the wireless mouse 200 in accordance with the first preferred embodiment of the present invention are shown from FIG. 1 to FIG. 13. The switch module 100 is mounted between the lower shell 201 and the upper shell 202. The upper shell 202 is covered to the lower shell 201 to form an accommodating space 203 between the upper shell 202 and the lower shell 201. The switch module 100 is accommodated in the accommodating space 203.

A rear of the lower shell 201 defines a sliding groove 204 penetrating through the lower shell 201 along an up-down direction. Several portions of a top surface of a lower portion of the lower shell 201 of the wireless mouse 200 protrude upward to form a plurality of propping portions 206. The top surface of the lower portion of the lower shell 201 protrudes upward to form a hollow location pillar 207. The location pillar 207 is disposed among the plurality of the propping portions 206. A middle of the hollow location pillar 207 defines an insertion hole 208 penetrating through a top of the middle of the hollow location pillar 207.

With reference to FIG. 1 to FIG. 10, the switch module 100 includes a pressing button 1, the circuit board 2 and a screw 3. The pressing button 1 is mounted on the top surface of the lower portion of the lower shell 201. The screw 3 passes through a corresponding mechanism of the circuit board 2 and the pressing button 1 for fastening the pressing button 1 to the lower shell 201 of the wireless mouse 200 to prevent the pressing button 1 being disengaged from the circuit board 2 and the lower shell 201 of the wireless mouse 200. In the first preferred embodiment, the lower shell 201 and the circuit board 2 are combined to form the outer shell assembly 121.

The pressing button 1 is fastened to the lower shell 201, and is fastened in the accommodating space 203 of the wireless mouse 200. The pressing button 1 has a fastening portion 10, a cantilever arm 11 opposite to the fastening portion 10, and a connecting portion 12 connected between the cantilever arm 11 and the fastening portion 10. The fastening portion 10 is fastened on the top surface of the lower portion of the lower shell 201. The fastening portion 10 has a through-hole 101 and a limiting portion 102. The through-hole 101 of the fastening portion 10 penetrates through the fastening portion 10 along the up-down direction. The limiting portion 102 projects beyond a rear surface of the fastening portion 10. The screw 3 passes through the through-hole 101 and is inserted into the insertion hole 208 of the location pillar 207 to fasten the pressing button 1 to the lower shell 201 of the wireless mouse 200 for preventing the pressing button 1 being disengaged from the lower shell 201. A top surface of the other side of the pressing button 1 protrudes upward to form the limiting portion 102. The limiting portion 102 is of an elliptical ring shape. The limiting portion 102 surrounds a top of the through-hole 101. The limiting portion 102 is used for limiting a position of the screw 3 to prevent the screw 3 from deviating. In the first preferred embodiment, the pressing button 1 is an elastic body, and has a pressed function and a resilience function.

One side of the fastening portion 10 extends outward and towards the cantilever arm 11, then extends frontward and further extends towards the cantilever arm 11 to form the connecting portion 12. The connecting portion 12 is of a Z shape seen from a top view. The circuit board 2 is disposed above and is spaced from the pressing button 1. The connecting portion 12 is suspended in midair and disposed under a bottom surface of the circuit board 2. One end of the connecting portion 12 extends outward and longitudinally extends in opposite directions to form the lengthwise cantilever arm 11. The circuit board 2 is disposed above and is spaced from the cantilever arm 11, so a gap 103 is formed between the cantilever arm 11 and the circuit board 2 to make the cantilever arm 11 be able to be pressed towards the circuit board 2 and rebounded to an original position of the cantilever arm 11 after the cantilever arm 11 is pressed towards the circuit board 2.

The cantilever arm 11 of the pressing button 1 has a base board 19, an operation rod 13 protruded downward from a bottom surface of the cantilever arm 11, an extending arm 14 located to one end of the operation rod 13, and at least one extending foot 15. A bottom surface of the pressing button 1 has the operation rod 13. The bottom surface of the cantilever arm 11 protrudes downward to form the operation rod 13. One side of a top surface of the base board 19 protrudes outward and extends to a bottom surface of the base board 19 to form the extending arm 14. The extending arm 14 projects beyond a front surface of the base board 19. The operation rod 13 is protruded downward from the bottom surface of the cantilever arm 11. The top surface of the base board 19 is flush with a top surface of the extending arm 14. The bottom surface of the base board 19 is flush with a bottom surface of the extending arm 14. The extending arm 14 is substantially in alignment with the base board 19 of the cantilever arm 11 along a longitudinal direction. The operation rod 13 is slidably exposed out of the lower shell 201 of the wireless mouse 200. The operation rod 13 is slidably disposed in the sliding groove 204. The lower shell 201 of the wireless mouse 200 has a first position 8 and a second position 9 opposite to each other. A rear end and a front end of the sliding groove 204 are defined as the first position 8 and the second position 9. The operation rod 13 is exposed out of the lower shell 201, and the operation rod 13 moves from the first position 8 to the second position 9. The operation rod 13 is pushed to move from the first position 8 to the second position 9 of the sliding groove 204. When the operation rod 13 of the pressing button 1 is pressed towards the circuit board 2, the extending arm 14 is used for pressing against and touching a corresponding structure of the circuit board 2 to execute a blue tooth pairing function.

A top surface of the pressing button 1 extends opposite to the operation rod 13 to form the at least one extending foot 15. At least one portion of an upper surface of one side of the pressing button 1 protrudes upward to form the at least one extending foot 15. At least one portion of one side of a top surface of the cantilever arm 11 protrudes upward and opposite to the operation rod 13 to form the at least one extending foot 15. The operation rod 13 is substantially in alignment with the at least one extending foot 15 along the up-down direction. When the operation rod 13 is pushed, the at least one extending foot 15 drives a corresponding part of the circuit board 2 to realize a power switch function. The other side of the top surface of the cantilever arm 11 defines a first buckling hole 17 and a second buckling hole 18 vertically penetrating through the cantilever arm 11. The first buckling hole 17 and the second buckling hole 18 are disposed to the other end of the operation rod 13. The first buckling hole 17 and the second buckling hole 18 are disposed to an outer side of the operation rod 13. The first buckling hole 17, the second buckling hole 18 and the operation rod 13 are longitudinally in alignment with one another. Each of the first buckling hole 17 and the second buckling hole 18 is used for buckling a corresponding portion of the lower shell 201 to realize a location and a fixation between the pressing button 1 and the lower shell 201.

One end of the extending arm 14 having a blocking block 16. The one end of the extending arm 14 extends perpendicular to one side surface of the cantilever arm 11 and facing the fastening portion 10 to form the blocking block 16. A top surface of the blocking block 16 is flush with the top surface of the cantilever arm 11. A bottom surface of the blocking block 16 is flush with the bottom surface of the cantilever arm 11. The blocking block 16 is used for abutting against a corresponding region of the lower shell 201. When the operation rod 13 is located at the first position 8, the blocking block 16 is blocked by the corresponding region of the lower shell 201 to make the pressing button 1 have no way of being pressed against the circuit board 2. Preferably, the blocking block 16 abuts against the corresponding region of the lower shell 201. When the operation rod 13 is located at the second position 9, the blocking block 16 breaks away from the corresponding region of the lower shell 201 to make the pressing button 1 capable of being pressed towards the circuit board 2.

In the first preferred embodiment, the operation rod 13 is substantially in alignment with the one extending foot 15 along the up-down direction. When the operation rod 13 is pushed, the one extending foot 15 drives the corresponding part of the circuit board 2 to realize the power switch function.

The circuit board 2 is disposed above and faces to the pressing button 1. The plurality of the propping portions 206 support against the circuit board 2 to make the circuit board 2 spaced from the pressing button 1. The circuit board 2 is equipped with a first switch 21, a second switch 22, a location hole 23 and an accommodating recess 24. A rear of a middle of the circuit board 2 defines the location hole 23 vertically penetrating through the circuit board 2. One side of the circuit board 2 is recessed inward to form the accommodating recess 24. One side of the first switch 21 has a sliding portion 211. The first switch 21 is mounted above the accommodating recess 24. The first switch 21 is mounted to a top surface of the one side of the circuit board 2 and partially projects above the accommodating recess 24.

The second switch 22 is mounted to the bottom surface of the circuit board 2 and is located adjacent to one end of the accommodating recess 24. The at least one extending foot 15 is corresponding to the sliding portion 211 of the first switch 21 to make the sliding portion 211 of the first switch 21 pushable. The first switch 21 is disposed to one side of the at least one extending foot 15 of the pressing button 1. When the operation rod 13 is pushed to move frontward and rearward, the at least one extending foot 15 moves frontward and rearward to drive the first switch 21 to realize the power switch function. When the extending arm 14 is pressed towards the bottom surface of the circuit board 2, the second switch 22 is used for touching the extending arm 14 to execute the blue tooth pairing function.

The sliding portion 211 is of a triangle shape seen from a vertical view. The sliding portion 211 is located above the accommodating recess 24. The pressing button 1 is mounted under and spaced from the circuit board 2. The pressing button 1 is disposed under the accommodating recess 24 of the circuit board 2. The cantilever arm 11 of the pressing button 1 is disposed under the accommodating recess 24 of the circuit board 2. The at least one extending foot 15 is disposed in the accommodating recess 24. The at least one extending foot 15 of pressing button 1 slides frontward and rearward in the accommodating recess 24, and the at least one extending foot 15 of the pressing button 1 is received in the accommodating recess 24 to be pressed or rebounded to an original position of the at least one extending foot 15. The accommodating recess 24 provides a movable space to make the at least one extending foot 15 of the cantilever arm 11 movable and be able to be pressed in the accommodating recess 24 and along the up-down direction.

In the first preferred embodiment, the first switch 21 is a power switch. The second switch 22 is a pairing switch. The screw 3 passes through the location hole 23, a middle of the limiting portion 102 and the through-hole 101 to be inserted into the insertion hole 208 of the hollow location pillar 207 to fasten the switch module 100. In the concrete implementation, the switch module 100 is capable of being fastened by use of other ways.

Referring to FIG. 3 to FIG. 6, the top surface of the lower portion of the lower shell 201 of the wireless mouse 200 has a buckling hook 212, a protruding block 213 and the location pillar 207. A middle of the top surface of the lower portion of the lower shell 201 protrudes upward to form the buckling hook 212. An upper portion of the buckling hook 212 is of a triangular shape and is spaced from the top surface of the lower portion of the lower shell 201. The buckling hook 212 is buckled with the blocking block 16. When the operation rod 13 is located at the first position 8, the blocking block 16 is blocked by a bottom surface of the upper portion of the buckling hook 212 to make the pressing button 1 have no way of being pressed towards the circuit board 2. Preferably, the blocking block 16 abuts against the bottom surface of the upper portion of the buckling hook 212. When the operation rod 13 is located at the second position 9, the blocking block 16 breaks away from the buckling hook 212 to make the pressing button 1 be able to be pressed.

A rear of the top surface of the lower portion of the lower shell 201 protrudes upward to form the protruding block 213. The protruding block 213 is located behind the buckling hook 212. The location pillar 207 is located to one side of an interval between the buckling hook 212 and the protruding block 213. When the pressing button 1 is located at the first position 8 or the second position 9, the protruding block 213 is used for switching different positions of the pressing button 1 in the lower shell 201 by virtue of switching the protruding block 213 from the first buckling hole 17 to the second buckling hole 18 to make the pressing button 1 have a segment decline feeling, a user easily recognizes an operation status. The hollow location pillar 207 is used for locating and fixing the screw 3 to realize that the switch module 100 is fastened to the lower shell 201 of the wireless mouse 200.

Figure 14:
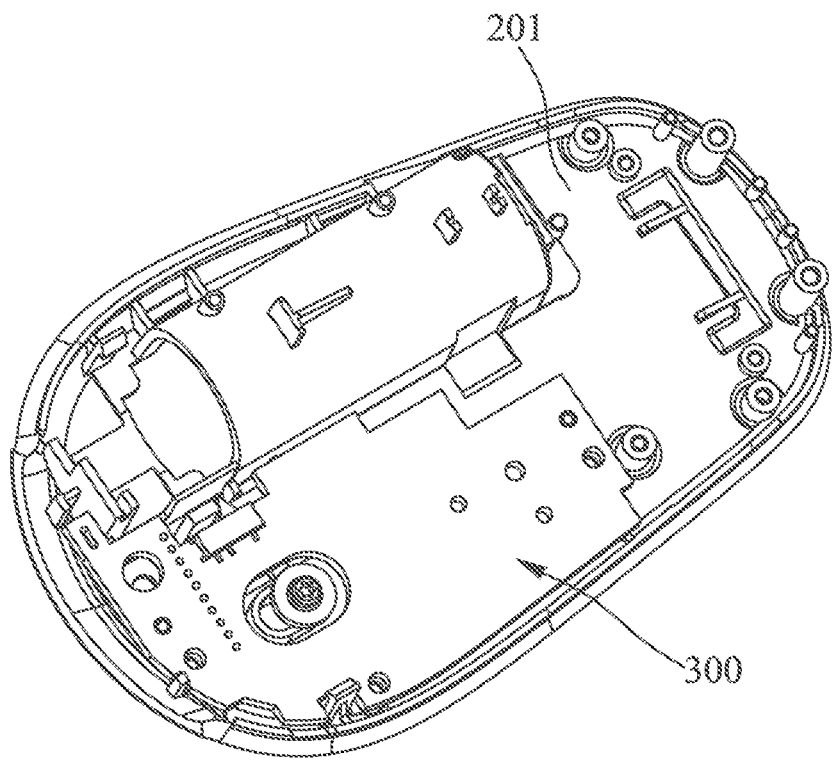
FIG. 14 is a location diagram of the switch module in accordance with a second preferred embodiment of the present invention.

Referring to FIG. 2 to FIG. 14, when the operation rod 13 of the pressing button 1 is located at the first position 8, the at least one extending foot 15 is corresponding to the first switch 21, the at least one extending foot 15 is without touching the first switch 21, the extending arm 14 is corresponding to the second switch 22, the protruding block 213 is buckled in the first buckling hole 17, the blocking block 16 is blocked by the bottom surface of the upper portion of the buckling hook 212 of the stopping portion 122, preferably, the blocking block 16 abuts against the bottom surface of the upper portion of the buckling hook 212 of the stopping portion 122, at the moment, a power function is turned off and the operation rod 13 has no way of being pressed. When the operation rod 13 of the pressing button 1 is located at the second position 9, the at least one extending foot 15 pushes the first switch 21, the extending arm 14 is corresponding to the second switch 22. The protruding block 213 is buckled in the second buckling hole 18, the blocking block 16 breaks away from the buckling hook 212 of the stopping portion 122, at the moment, the power function is turned on, and the operation rod 13 is able to be pressed to make the extending arm 14 touch the second switch 22 to execute the blue tooth pairing function.

Figure 15:
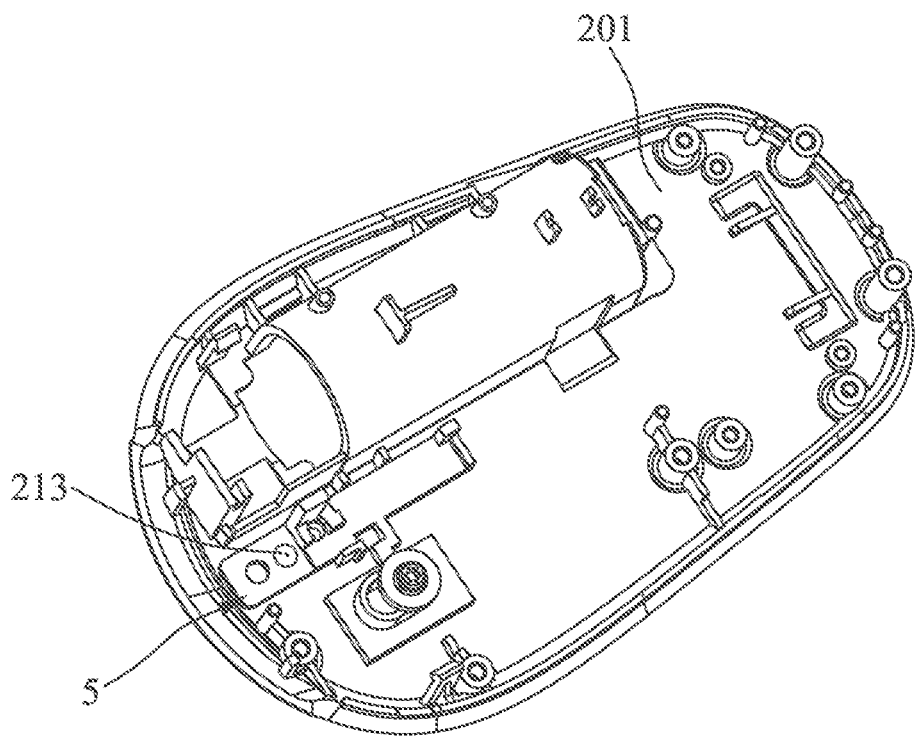
FIG. 15 is a key location diagram of the switch module in accordance with the second preferred embodiment of the present invention.
Figure 16:
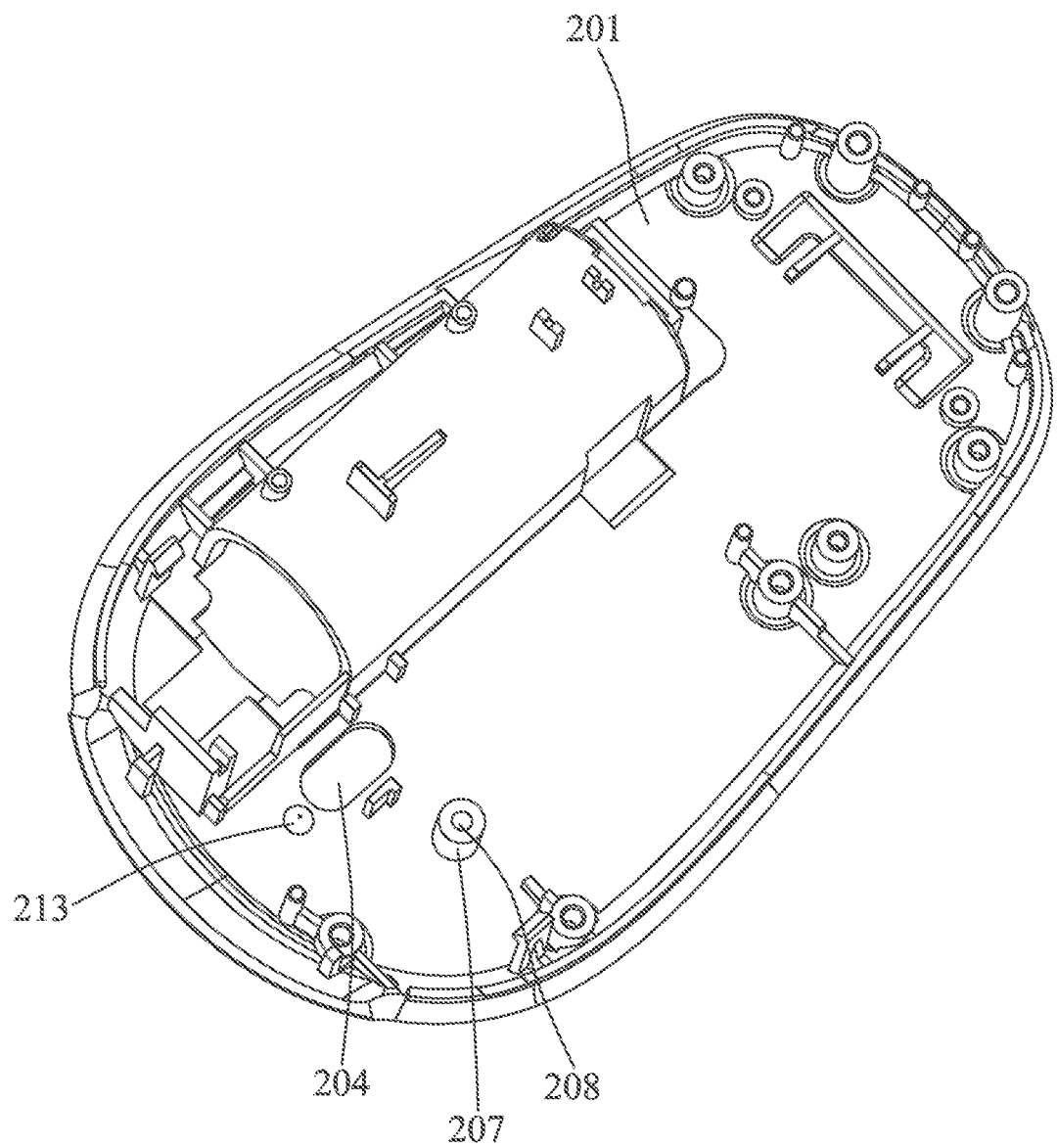
FIG. 16 is a perspective view of the lower shell of the wireless mouse in accordance with the second preferred embodiment of the present invention.
Figure 17:
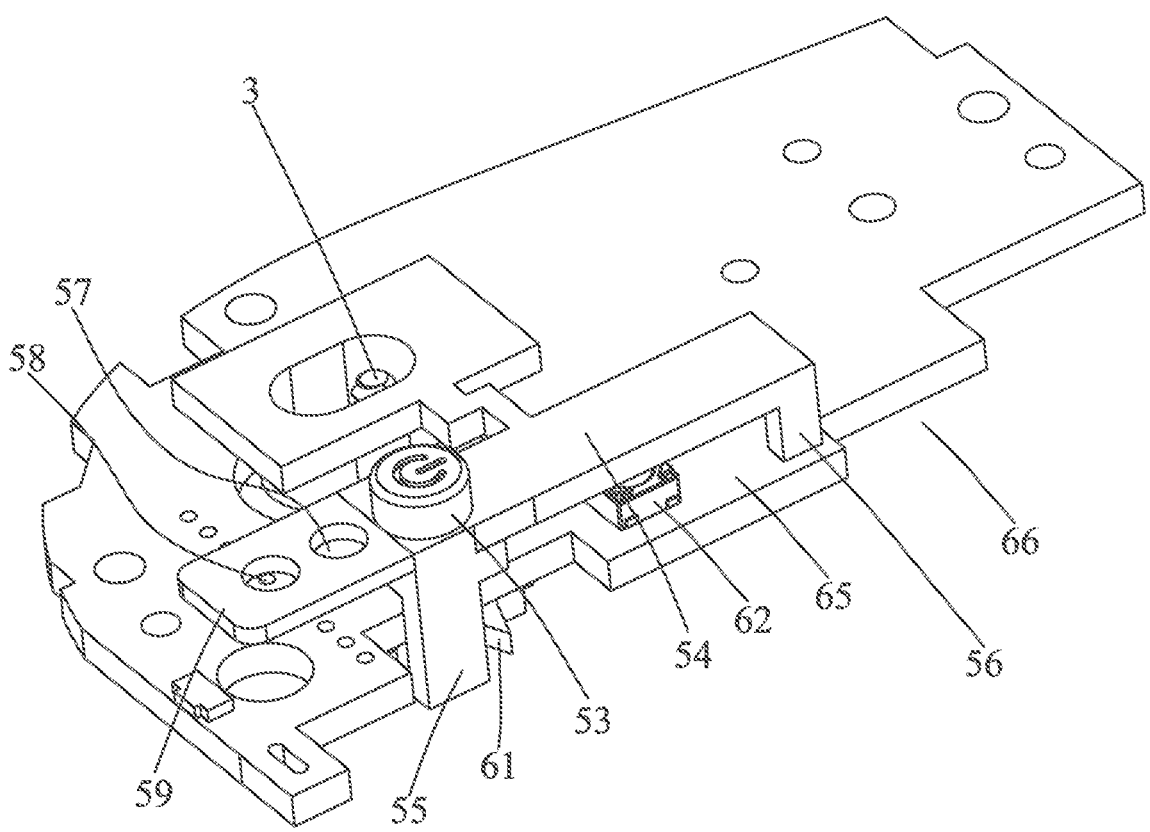
FIG. 17 is a perspective view of the switch module in accordance with the second preferred embodiment of the present invention.
Figure 18:
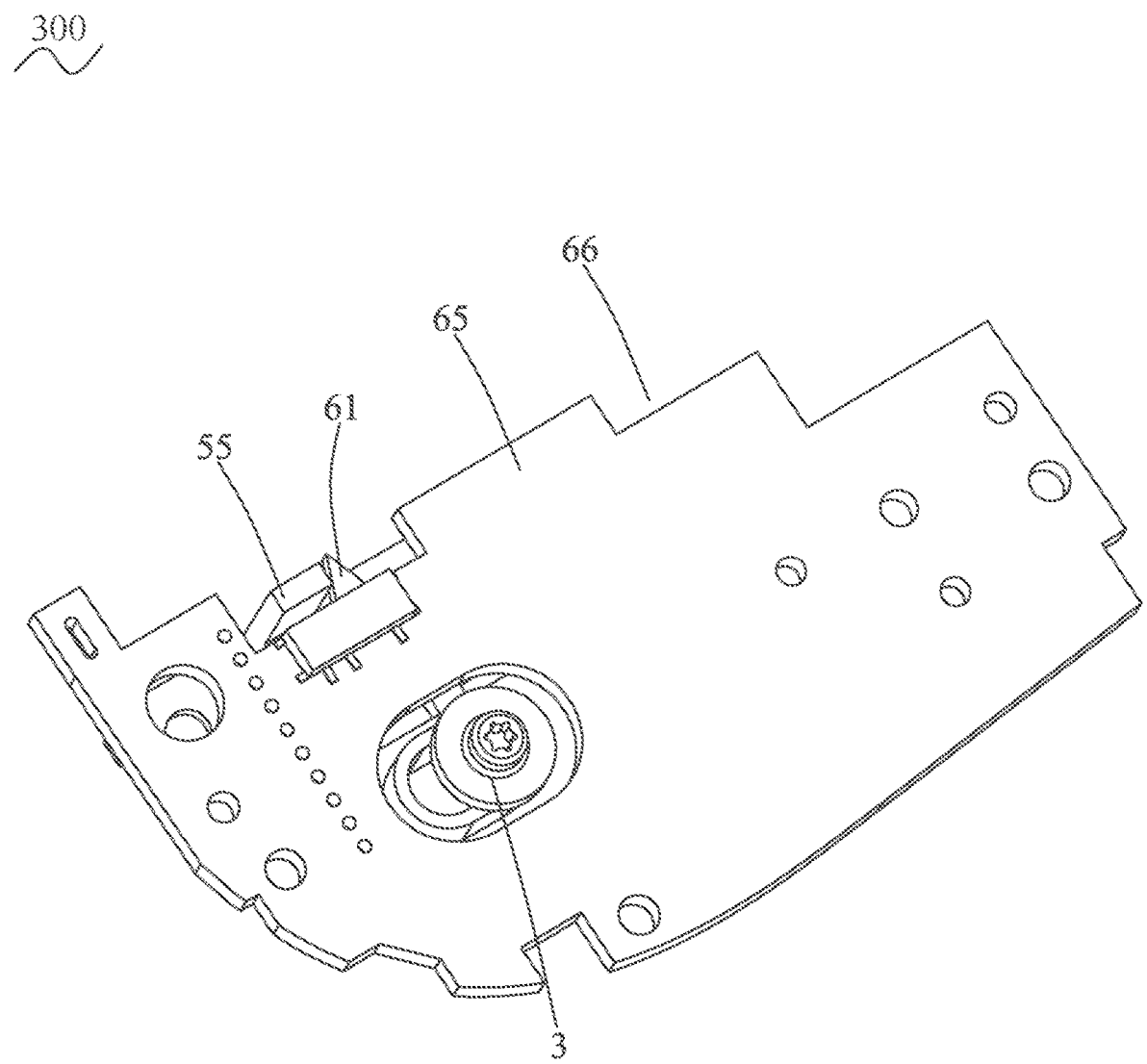
FIG. 18 is another perspective view of the switch module in accordance with the second preferred embodiment of the present invention.
Figure 19:
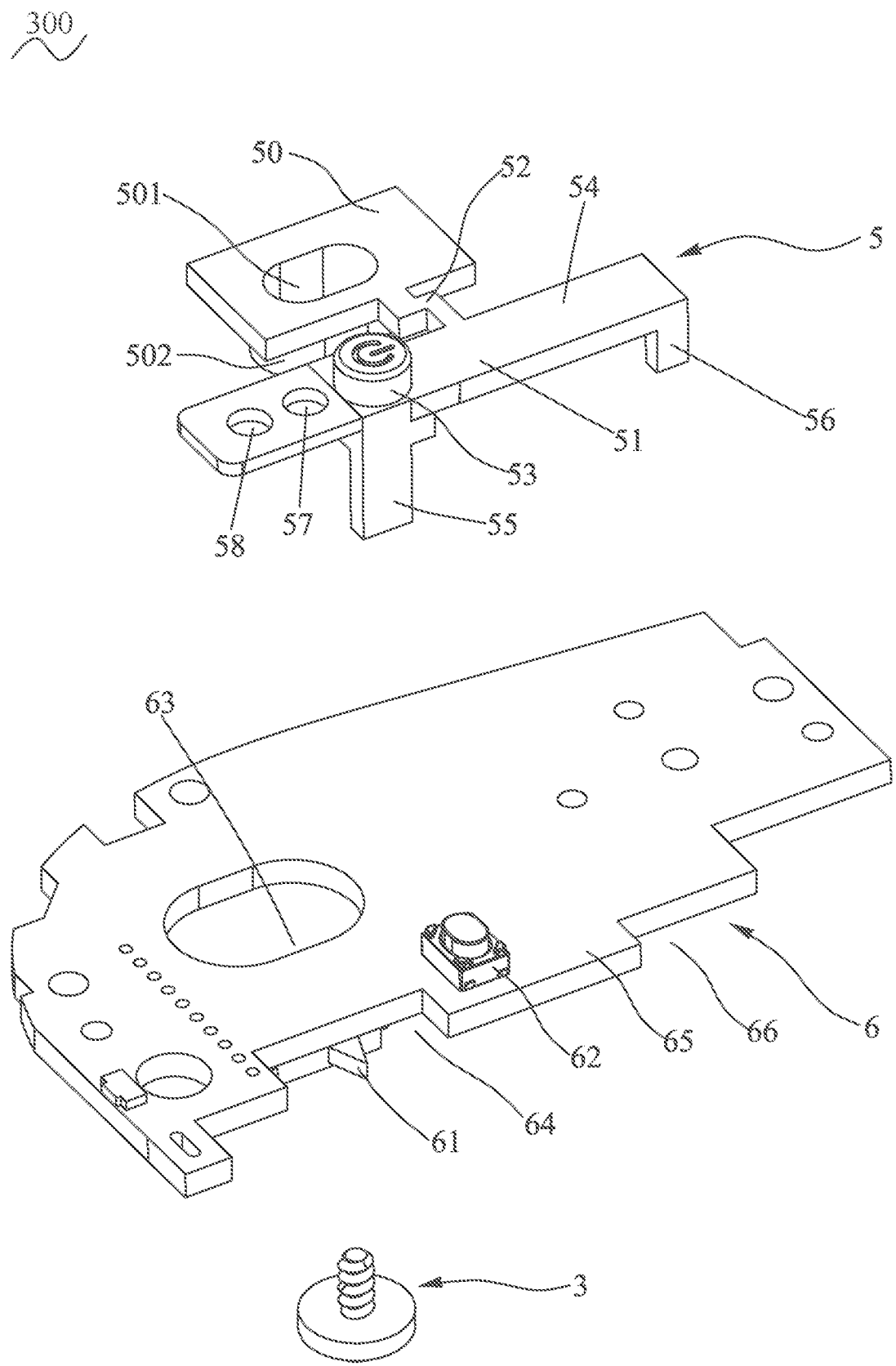
FIG. 19 is an exploded view of the switch module in accordance with the second preferred embodiment of the present invention.
Figure 20:
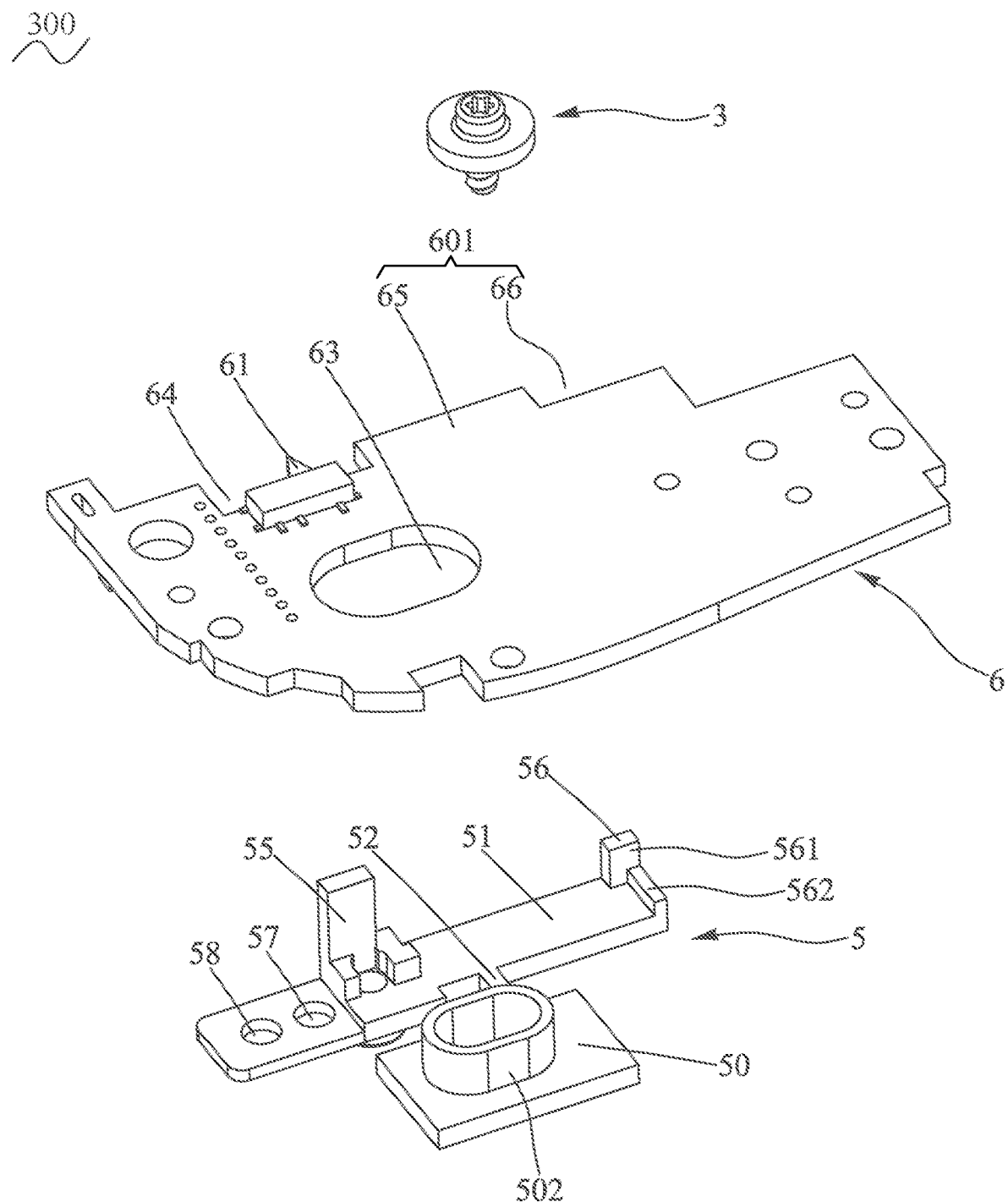
FIG. 20 is another exploded view of the switch module in accordance with the second preferred embodiment of the present invention.
Figure 21:
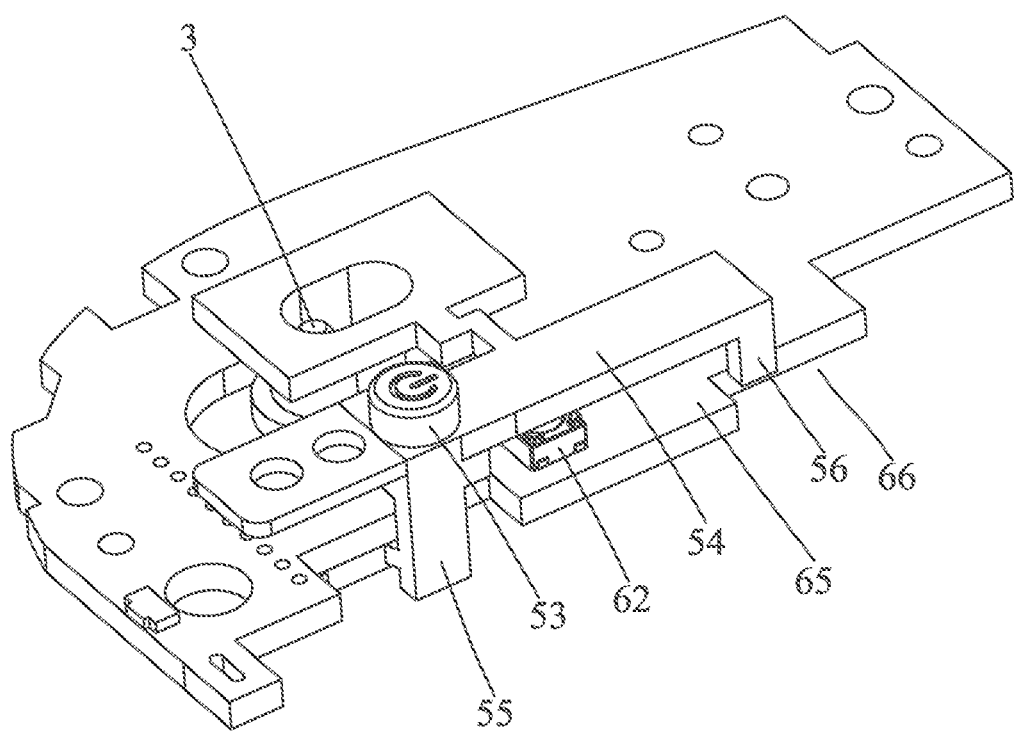

Referring to FIG. 14 to FIG. 21, a switch module 300 in accordance with a second preferred embodiment of the present invention is shown. The switch module 300 is applied in a wireless mouse 400. The wireless mouse 400 includes the lower shell 201. In the second preferred embodiment, the switch module 300 includes a pressing button 5, a circuit board 6 and the screw 3. The pressing button 5 has a fastening portion 50, a cantilever arm 51 and a connecting portion 52. The cantilever arm 51 has a base board 59, an operation rod 53, an extending arm 54 and at least one extending foot 55. At least one portion of an upper surface of one side of the pressing button 5 protrudes upward to form the at least one extending foot 55. The fastening portion 50 is fastened on the top surface of the lower portion of the lower shell 201. The fastening portion 50 has a through-hole 501 and a limiting portion 502. The through-hole 501 of the fastening portion 50 penetrates through the fastening portion 50 along the up-down direction. The screw 3 passes through the through-hole 501 and is inserted into the insertion hole 208 of the location pillar 207 to fasten the pressing button 5 to the lower shell 201 of the wireless mouse 200 for preventing the pressing button 5 being disengaged from the lower shell 201. A middle of a top surface of the other side of the pressing button 5 protrudes upward to form the limiting portion 502. The limiting portion 502 is of the elliptical ring shape. The limiting portion 502 surrounds a top of the through-hole 501. The limiting portion 502 is used for limiting the position of the screw 3 to prevent the screw 3 from deviating. In the second preferred embodiment, the pressing button 5 is the elastic body, and has the pressed function and the resilience function.

One side of the fastening portion 50 extends outward and towards the cantilever arm 51, then extends frontward and further extends towards the cantilever arm 51 to form the connecting portion 52. The connecting portion 52 is of the Z shape seen from the top view. The circuit board 6 is disposed above and is spaced from the pressing button 5. The connecting portion 52 is disposed under the circuit board 6. One end of the connecting portion 52 extends outward and longitudinally extends in opposite directions to form the lengthwise cantilever arm 51. The connecting portion 52 is connected between the cantilever arm 51 and the fastening portion 50. The gap 103 is formed between the cantilever arm 51 and the circuit board 6 to make the cantilever arm 51 be able to be pressed towards the circuit board 6 and rebounded to an original position of the cantilever arm 51 after the cantilever arm 51 is pressed towards the circuit board 6.

A bottom surface of the cantilever arm 51 protrudes downward to form the operation rod 53. One side of a top surface of the base board 59 protrudes outward and extends to a bottom surface of the base board 59 to form the extending arm 54. The extending arm 54 projects beyond a front surface of the base board 59. The operation rod 53 is protruded downward from the bottom surface of the cantilever arm 51. The top surface of the base board 59 is flush with a top surface of the extending arm 54. The bottom surface of the base board 59 is flush with a bottom surface of the extending arm 54. The extending arm 54 is substantially in alignment with the base board 59. The operation rod 53 is slidably exposed out of the lower shell 201 of the wireless mouse 200. The operation rod 53 is slidably disposed in the sliding groove 204. The operation rod 53 is pushed to move from the first position 8 to the second position 9 of the sliding groove 204. When the operation rod 53 of the pressing button 5 is pressed towards the circuit board 6, the extending arm 54 is used for pressing against and touching a corresponding structure of the circuit board 6 to execute the blue tooth pairing function. One end of the top surface of the extending arm 54 protrudes upward to form a blocking block 56. The blocking block 56 includes a vertical portion 561 protruded upward from one side of a front of the top surface of the extending arm 54, and a transverse portion 562 transversely extended towards the other side of the front of the top surface of the extending arm 54 from a lower portion of the vertical portion 561. The blocking block 56 is used for abutting against a corresponding portion of the circuit board 6.

When the operation rod 53 of the pressing button 5 is located at the first position 8, the blocking block 56 abuts against the corresponding portion of the circuit board 6 to make the pressing button 5 have no way of being pressed. When the operation rod 53 of the pressing button 5 is located at the second position 9, the blocking block 56 is located under the corresponding portion of the circuit board 6 to make the pressing button 5 be able to be pressed. At least one portion of one side of a top surface of the cantilever arm 51 protrudes upward to form the at least one extending foot 55. The operation rod 53 is substantially in alignment with the at least one extending foot 55 along the up-down direction. When the operation rod 53 is pushed, the at least one extending foot 55 touches and drives a corresponding part of the circuit board 6 to realize the power switch function. The other side of the top surface of the cantilever arm 51 defines a first buckling hole 57 and a second buckling hole 58 vertically penetrating through the cantilever arm 51. The first buckling hole 57, the second buckling hole 58 and the operation rod 53 are in alignment with one another. Each of the first buckling hole 57 and the second buckling hole 58 is used for buckling the corresponding portion of the lower shell 201 to realize the location and the fixation between the pressing button 1 and the lower shell 201.

The circuit board 6 is disposed above and faces to the pressing button 5. The plurality of the propping portions 206 support against the circuit board 6 to make the circuit board 6 spaced from the pressing button 5. The circuit board 6 is equipped with a first switch 61, a second switch 62, a location hole 63, an accommodating recess 64, a blocking area 65 and a lacking groove 66. One side of the first switch 61 has a sliding portion 611. The sliding portion 611 is of the triangle shape. A rear of a middle of the circuit board 6 defines the location hole 63 vertically penetrating through the circuit board 6. A rear of one side of the circuit board 6 is recessed inward to form the accommodating recess 64. A front of the one side of the circuit board 6 is recessed inward to form the lacking groove 66. The lacking groove 66 is spaced from the accommodating recess 64 by the blocking area 65. The lacking groove 66 and the accommodating recess 64 are located to two sides of the blocking area 65. The blocking area 65 is used for abutting against the blocking block 56 to make the pressing button 5 have no way of being pressed towards the circuit board 6. The cantilever arm 51 of the pressing button 5 is disposed under the accommodating recess 64 of the circuit board 6. The at least one extending foot 55 is disposed in the accommodating recess 64. The at least one extending foot 55 of pressing button 5 slides frontward and rearward in the accommodating recess 64, and the at least one extending foot 55 of the pressing button 5 is received in the accommodating recess 64 to be pressed or rebounded to an original position of the at least one extending foot 55. The accommodating recess 64 provides the movable space to make the cantilever arm 51 movable and be able to be pressed in the accommodating recess 64. When the blocking block 56 moves to be under the lacking groove 66, the lacking groove 66 is used for making the pressing button 5 be able to be pressed towards the circuit board 6.

The blocking area 65 and the blocking block 56 form an anti-pressure assembly 601 for preventing the pressing button 5 being pressed. When the operation rod 53 is located at the first position 8, the blocking block 56 abuts against the blocking area 65 to make the pressing button 5 have no way of being pressed. When the operation rod 53 is located at the second position 9, the blocking block 56 moves to be under the lacking groove 66 to make the pressing button 5 be able to be pressed.

In the second preferred embodiment, the first switch 61 is the power switch. The second switch 62 is the pairing switch. The screw 3 passes through the location hole 63, a middle of the limiting portion 502 and the through-hole 501 to be inserted into the insertion hole 208 of the hollow location pillar 207 to fasten the switch module 300. In the concrete implementation, the switch module 300 is capable of being fastened by use of other ways. The first switch 61 is mounted above the accommodating recess 64. The first switch 61 is mounted to a top surface of the one side of the circuit board 6 and partially projects above the accommodating recess 64. The at least one extending foot 55 is corresponding to the sliding portion 611 of the first switch 61 to make the sliding portion 611 of the first switch 61 pushable. The sliding portion 611 of the first switch 61 is disposed to one side of the at least one extending foot 55 of the pressing button 5. When the operation rod 53 is pushed to move frontward and rearward, the at least one extending foot 55 moves frontward and rearward to drive the sliding portion 611 of the first switch 61 to realize the power switch function. The second switch 62 is mounted to a bottom surface of the circuit board 6 and is located adjacent to one end of the accommodating recess 64. When the extending arm 54 is pressed towards the bottom surface of the circuit board 6, the second switch 62 is used for touching the extending arm 54 to execute the blue tooth pairing function.

Referring to FIG. 1 to FIG. 17, the top surface of the lower portion of the lower shell 201 of the wireless mouse 400 has the protruding block 213 and the location pillar 207. When the pressing button 5 is located at the first position 8 or the second position 9, the protruding block 213 is used for switching different positions of the pressing button 5 in the lower shell 201 by virtue of switching the protruding block 213 from the first buckling hole 57 to the second buckling hole 58 to make the pressing button 5 have the segment decline feeling, the user easily recognizes the operation status. The hollow location pillar 207 is used for locating and fixing the screw 3 to realize that the switch module 100 is fastened to the lower shell 201 of the wireless mouse 200. The location pillar 207 is used for being located with and being fixed with the screw 3 to realize that the switch module 300 is fastened to the lower shell 201 of the wireless mouse 400.

Referring to FIG. 1 to FIG. 21, when the operation rod 53 is located at the first position 8, the at least one extending foot 55 is without driving the first switch 61, the protruding block 213 is buckled in the first buckling hole 57, the blocking block 56 abuts against the blocking area 65 to make the pressing button 5 have no way of being pressed, at the moment, the power function is turned off. When the operation rod 53 is located at the second position 9, the at least one extending foot 55 drives the first switch 61, the protruding block 213 is buckled in the second buckling hole 58, the blocking block 56 moves to be under the lacking groove 66 to make the pressing button 5 be able to be pressed, at the moment, the power function is turned on, and the operation rod 53 is able to be pressed towards the circuit board 6 to make the extending arm 54 touch the second switch 62 to execute the blue tooth pairing function.

In the concrete implementation, the stopping portion 122 of the outer shell assembly 121 is disposed to the outer shell assembly 121. The stopping portion 122 is the blocking area 65 of the circuit board 6 or the buckling hook 212 of the lower shell 201. The blocking block 56 is blocked by the stopping portion 122.

As described above, in a process of pushing the operation rod 13 or the operation rod 53 to move frontward and rearward, when the operation rod 13 or the operation rod 53 is located at the first position 8, the at least one extending foot 15 is without driving the first switch 21, or the at least one extending foot 55 is without driving the first switch 61, the protruding block 213 is buckled in the first buckling hole 17 or the first buckling hole 57, the blocking block 16 abuts against the buckling hook 212, or the blocking block 56 abuts against the blocking area 65 to make the pressing button 1 or the pressing button 5 have no way of being pressed, at the moment, the power function is turned off, when the operation rod 13 or the operation rod 53 is located at the second position 9, the at least one extending foot 15 drives the first switch 21, or the at least one extending foot 55 drives the first switch 61, the protruding block 213 is buckled in the second buckling hole 18, or the protruding block 213 is buckled in the second buckling hole 58, the blocking block 16 breaks away from the buckling hook 212, or the blocking block 56 moves to be under the lacking groove 66 to make the pressing button 5 be able to be pressed, at the moment, the power function is turned on, and the operation rod 13 or the operation rod 53 is able to be pressed towards the circuit board 2 or the circuit board 6 to make the extending arm 14 or the extending arm 54 touch the second switch 22 or the second switch 62 to execute the blue tooth pairing function. As a result, the switch module 100 or the switch module 300 is applied in the wireless mouse 200 or the wireless mouse 400, and has a smaller occupying space and a lower manufacturing cost, and the wireless mouse 200 or the wireless mouse 400 has a smaller assembling space and a lower cost.

What is claimed is:

1. A switch module applied in a wireless mouse, the wireless mouse including an outer shell assembly which includes a lower shell, and a stopping portion formed at the lower shell, the lower shell having a first position and a second position opposite to each other, the switch module comprising:

a pressing button having a fastening portion, a cantilever arm opposite to the fastening portion, and a connecting portion connected between the cantilever arm and the fastening portion, one side of the fastening portion extending outward and towards the cantilever arm, then extending frontward and further extending towards the cantilever arm to form the connecting portion, one end of the connecting portion extending outward and longitudinally extending in opposite directions to form the cantilever arm, a bottom surface of the pressing button having an operation rod, the operation rod being exposed out of the lower shell, and the operation rod moving from the first position to the second position, the pressing button having an extending arm located to one end of the operation rod, one end of the extending arm having a blocking block, a top surface of the pressing button extending opposite to the operation rod to form at least one extending foot; and a circuit board fastened to the lower shell, the circuit board being disposed above and spaced from the pressing button, the circuit board being equipped with a first switch mounted to a top surface of one side of the circuit board, and a second switch mounted to a bottom surface of the circuit board, the at least one extending foot being corresponding to the first switch, the extending arm being corresponding to the second switch, wherein the circuit board is disposed above and spaced from the cantilever arm to form a gap between the cantilever arm and the circuit board, when the operation rod is located at the first position, the at least one extending foot is without touching the first switch, the blocking block is blocked by the stopping portion, and when the operation rod is located at the second position, the at least one extending foot pushes the first switch, the blocking block breaks away from the stopping portion.

2. The switch module as claimed in claim 1, wherein the stopping portion is a buckling hook of the lower shell, a middle of a top surface of a lower portion of the lower shell protrudes upward to form the buckling hook, the one end of the extending arm extends perpendicular to one side surface of the cantilever arm and facing the fastening portion to form the blocking block, when the operation rod is located at the first position, the blocking block is blocked by a bottom surface of an upper portion of the buckling hook, when the operation rod is located at the second position, the blocking block breaks away from the buckling hook.

3. The switch module as claimed in claim 2, wherein the blocking block abuts against the bottom surface of the upper portion of the buckling hook.

4. The switch module as claimed in claim 1, wherein the stopping portion is a blocking area of the circuit board, one side of the circuit board is recessed inward to form an accommodating recess, a front of the one side of the circuit board is recessed inward to form a lacking groove, the lacking groove is spaced from the accommodating recess by the blocking area, one end of a top surface of the extending arm protrudes upward to form the blocking block, when the operation rod is located at the first position, the blocking block abuts against the blocking area, when the operation rod is located at the second position, the blocking block moves to be under the lacking groove.

5. The switch module as claimed in claim 4, wherein the blocking block includes a vertical portion protruded upward from one side of a front of the top surface of the extending arm, and a transverse portion transversely extended towards the other side of the front of the top surface of the extending arm from a lower portion of the vertical portion.

6. The switch module as claimed in claim 1, wherein the connecting portion is suspended in midair and disposed under the bottom surface of the circuit board.

7. The switch module as claimed in claim 1, wherein the cantilever arm of the pressing button has a base board, the operation rod, the extending arm and the at least one extending foot, a bottom surface of the cantilever arm protrudes downward to form the operation rod, one side of a top surface of the base board protrudes outward and extends to a bottom surface of the base board to form the extending arm, the extending arm is substantially in alignment with the base board of the cantilever arm along a longitudinal direction, at least one portion of one side of a top surface of the cantilever arm protrudes upward and opposite to the operation rod to form the at least one extending foot, the operation rod is substantially in alignment with the at least one extending foot along an up-down direction.

8. The switch module as claimed in claim 7, wherein the other side of the top surface of the cantilever arm defines a first buckling hole and a second buckling hole vertically penetrating through the cantilever arm, the first buckling hole and the second buckling hole are disposed to the other end of the operation rod, a rear of a top surface of a lower portion of the lower shell protrudes upward to form a protruding block, when the operation rod is located at the first position, the protruding block is buckled in the first buckling hole, when the operation rod is located at the second position, the protruding block is buckled in the second buckling hole.

9. The switch module as claimed in claim 8, wherein the first buckling hole, the second buckling hole and the operation rod are longitudinally in alignment with one another.

10. The switch module as claimed in claim 1, wherein the one side of the circuit board is recessed inward to form an accommodating recess, the cantilever arm of the pressing button is disposed under the accommodating recess of the circuit board.

11. The switch module as claimed in claim 1, wherein the pressing button is an elastic body.

12. The switch module as claimed in claim 1, wherein the blocking block abuts against the stopping portion.

13. A switch module applied in a wireless mouse which includes a lower shell, a middle of a top surface of a lower portion of the lower shell protruding upward to form a buckling hook, the lower shell having a first position and a second position opposite to each other, the switch module comprising:

a pressing button having a fastening portion, a cantilever arm opposite to the fastening portion, and a connecting portion connected between the cantilever arm and the fastening portion, a bottom surface of the cantilever arm protruding downward to form an operation rod, the operation rod being exposed out of the lower shell, and the operation rod moving from the first position to the second position, the cantilever arm having a base board, one side of a top surface of the base board protruding outward and extending to a bottom surface of the base board to form an extending arm located to one end of the operation rod, one end of the extending arm extending perpendicular to one side surface of the cantilever arm and facing the fastening portion to form a blocking block, at least one portion of one side of a top surface of the cantilever arm protruding upward and opposite to the operation rod to form at least one extending foot; and a circuit board fastened to the lower shell, the circuit board being disposed above and spaced from the pressing button, the circuit board being equipped with a first switch and a second switch, the at least one extending foot being corresponding to the first switch, the extending arm being corresponding to the second switch, wherein when the operation rod is located at the first position, the at least one extending foot is without touching the first switch, the blocking block is blocked by a bottom surface of an upper portion of the buckling hook, when the operation rod is located at the second position, the at least one extending foot pushes the first switch, the blocking block breaks away from the buckling hook.

14. The switch module as claimed in claim 13, wherein the other side of the top surface of the cantilever arm defines a first buckling hole and a second buckling hole vertically penetrating through the cantilever arm, the first buckling hole and the second buckling hole are disposed to the other end of the operation rod, a rear of the top surface of the lower portion of the lower shell protrudes upward to form a protruding block, when the operation rod is located at the first position, the protruding block is buckled in the first buckling hole, when the operation rod is located at the second position, the protruding block is buckled in the second buckling hole.

15. A switch module applied in a wireless mouse which includes a lower shell, the lower shell having a first position and a second position opposite to each other, the switch module comprising:

a pressing button having a cantilever arm, an operation rod protruded downward from a bottom surface of the cantilever arm, and an extending arm located to one end of the operation rod, the operation rod being exposed out of the lower shell, and the operation rod moving from the first position to the second position, one end of a top surface of the extending arm protruding upward to form a blocking block, at least one portion of one side of a top surface of the cantilever arm protruding upward and opposite to the operation rod to form at least one extending foot; and a circuit board fastened to the lower shell, the circuit board being disposed above and spaced from the pressing button, the circuit board being equipped with a first switch and a second switch, one side of the circuit board being recessed inward to form an accommodating recess, a front of the one side of the circuit board being recessed inward to form a lacking groove, the lacking groove being spaced from the accommodating recess by a blocking area, the at least one extending foot being corresponding to the first switch, the extending arm being corresponding to the second switch;

wherein when the operation rod is located at the first position, the at least one extending foot is without touching the first switch, the blocking block abuts against the blocking area, when the operation rod is located at the second position, the at least one extending foot pushes the first switch, the blocking block moves to be under the lacking groove.

16. The switch module as claimed in claim 15, wherein the other side of the top surface of the cantilever arm defines a first buckling hole and a second buckling hole vertically penetrating through the cantilever arm, the first buckling hole and the second buckling hole are disposed to the other end of the operation rod, a rear of a top surface of a lower portion of the lower shell protrudes upward to form a protruding block, when the operation rod is located at the first position, the protruding block is buckled in the first buckling hole, when the operation rod is located at the second position, the protruding block is buckled in the second buckling hole.

* * * * *